United States Patent [19]
Uwakubo

[11] Patent Number: 6,118,460
[45] Date of Patent: Sep. 12, 2000

[54] VIRTUAL PSEUDO-HUMAN FIGURE GENERATING SYSTEM

[75] Inventor: Shinichi Uwakubo, Tokyo, Japan

[73] Assignee: NEC Corporation, Tokyo, Japan

[21] Appl. No.: 09/017,232

[22] Filed: Feb. 2, 1998

[30] Foreign Application Priority Data

Feb. 7, 1997 [JP] Japan .................................. 9-025108

[51] Int. Cl.[7] .............................................. G06T 15/70
[52] U.S. Cl. ............................................................ 345/474
[58] Field of Search ............................... 345/474–475, 345/473

[56] References Cited

U.S. PATENT DOCUMENTS

| | | | |
|---|---|---|---|
| 5,877,778 | 3/1999 | Dow et al. | 345/474 |
| 5,923,337 | 7/1999 | Yamamoto | 345/473 |

FOREIGN PATENT DOCUMENTS

| | | |
|---|---|---|
| 60-157693 | 8/1985 | Japan . |
| 3-215891 | 9/1991 | Japan . |
| 6-202831 | 7/1994 | Japan . |
| 7-44726 | 2/1995 | Japan . |
| 8-106374 | 4/1996 | Japan . |

OTHER PUBLICATIONS

"Nikkei Computer", *Nikkei BP*, pp. 124–126, Jan. 22, 1996.

*Primary Examiner*—Mark K. Zimmerman
*Assistant Examiner*—Lance W. Sealey
*Attorney, Agent, or Firm*—Foley & Lardner

[57] ABSTRACT

It is intended to generate a virtual pseudo-human figure model which can perform more natural-looking motions.

In a system which stores actions of the virtual pseudo-human figure model and causes the virtual pseudo-human figure model to perform desired motions by applying these motion patterns to the model, intermediate motion patterns to smoothly link one motion pattern to the next are stored, and these intermediate motions are filled in between basic motion patterns or, when no motion takes place for a certain period of time, the blank of motion is complemented with an idling motion pattern. Or the motion patterns are stored as classified by model attributes of the virtual pseudo-human figure model, and motion patterns corresponding to the model attributes are applied. Furthermore, when motion patterns are applied to the virtual pseudo-human figure model, certain correction is made.

15 Claims, 10 Drawing Sheets

| MOTION PATTERN NAME | MODEL ATTRIBUTE | MOTION PARAMETERS | | | |
|---|---|---|---|---|---|
| | | POSITION | DIRECTION | QUANTITY | DURATION |
| NODDING | STANDARD | NECK | X AXIS | +5 | 0.2 |
| | | NECK | X AXIS | -5 | 0.1 |
| NODDING | EXTREMELY BIGHEADED | NECK | X AXIS | +15 | 0.2 |
| | | NECK | X AXIS | -15 | 0.1 |
| ... | | ... | ... | ... | ... |
| POINTING RIGHT | STANDARD | RIGHT ELBOW | X AXIS | +15 | 0.3 |
| | | RIGHT ARM | Y AXIS | -20 | 0.2 |
| | | ... | ... | ... | ... |
| | | RIGHT ELBOW | X AXIS | -15 | 0.2 |

COMPOSITION OF MODEL-BY-MODEL MOTION PATTERNS

| MOTION PATTERN NAME | MOTION PARAMETERS | | | |
|---|---|---|---|---|
| | POSITION | DIRECTION | QUANTITY | DURATION |
| NODDING | NECK | X AXIS | +5 | 0.2 |
| | NECK | X AXIS | -5 | 0.1 |
| ... | ... | ... | ... | ... |
| POINTING RIGHT | RIGHT ELBOW | X AXIS | +15 | 0.3 |
| | RIGHT ARM | Y AXIS | -20 | 0.2 |
| | ... | ... | ... | ... |
| | RIGHT ELBOW | X AXIS | -15 | 0.2 |

Fig.3

| STARTING MOTION PATTERN NAME | ENDING MOTION PATTERN NAME | INTERMEDIATE MOTION PATTERN |
|---|---|---|
| WALKING | RUNNING | IMP-001 |
| RUNNING | WALKING | IMP-002 |
| ... | ... | ... |

| MOTION PATTERN NAME | MODEL ATTRIBUTE | MOTION PARAMETERS | | | |
|---|---|---|---|---|---|
| | | POSITION | DIRECTION | QUANTITY | DURATION |
| NODDING | STANDARD | NECK | X AXIS | +5 | 0.2 |
| | | NECK | X AXIS | -5 | 0.1 |
| NODDING | EXTREMELY BIGHEADED | NECK | X AXIS | +15 | 0.2 |
| | | NECK | X AXIS | -15 | 0.1 |
| ... | | ... | ... | ... | ... |
| POINTING RIGHT | STANDARD | RIGHT ELBOW | X AXIS | +15 | 0.3 |
| | | RIGHT ARM | Y AXIS | -20 | 0.2 |
| | | ... | ... | ... | ... |
| | | RIGHT ELBOW | X AXIS | -15 | 0.2 |

COMPOSITION OF MODEL-BY-MODEL MOTION PATTERNS

Fig.8

EXTENSION/ COMPRESSION

| TYPE OF MOTION CORRECTION | POSITION | ↓ | CORRECTIVE INFORMATION | | | | | | |
|---|---|---|---|---|---|---|---|---|---|
| SLOW-IN | WHOLE BODY | 1.0 | +0.0 | +0.6 | +0.9 | ... | +1.0 | +1.0 | +1.0 |
| SLOW-OUT | WHOLE BODY | 1.0 | +1.0 | +1.0 | +1.0 | ... | +0.6 | +0.3 | +0.0 |
| WAIT | WHOLE BODY | 1.0 | +1.0 | +0.9 | +0.6 | ... | +0.0 | +0.0 | +0.0 |
| REACTION | WHOLE BODY | 1.0 | +1.0 | +0.9 | +0.5 | ... | -0.3 | -0.1 | +0.0 |
| FOLLOW THROUGH | WRIST | 1.0 | +0.3 | +0.6 | +0.9 | | +1.0 | +1.0 | +1.0 |
|  | ELBOW | 1.0 | +0.0 | +0.3 | +0.6 | ... | +1.0 | +1.0 | +1.0 |
|  | SHOULDER | 1.0 | +0.0 | +0.0 | +0.3 | | +0.9 | +1.0 | +1.0 |
| THROW | WHOLE BODY | 2.0 | +1.0 | +1.0 | | | | | |
| ... | | | | | | | | | |

COMPOSITION OF MOTION PATTERN CORRECTIVE INFORMATION

Fig.9

BOWING

RAISING A HAND

KNITTING BROWS

VIRTUAL PSEUDO-HUMAN FIGURE GENERATING SYSTEM

BACKGROUND OF THE INVENTION

1. Field of the Invention

The present invention relates to a virtual pseudo-human figure generating system for generating the motions and facial expressions of virtual pseudo-human figures used in user interfaces of computer systems or the like, and more particularly to a virtual pseudo-human figure generating system with motion modifying and motion complementing functions for generating natural-looking motions of virtual pseudo-human figures.

2. Description of the Related Art

Conventionally, user interfaces utilizing virtual pseudo-human figures created by computer graphics are known as personifying agents. Concerning such personifying agents, Nikkei Computer published by Nikkei BP (Jan. 22, 1996, pp. 124–126) carried an article entitled "Research on personifying agents in progress: application to next generation interfaces eyed." By the technique described in this reference, a virtual pseudo-human figure is shown on a computer display screen and, by giving that virtual pseudo-human figure facial expressions, motions and speech to converse with the user, enables the user to operate the computer as if he or she was speaking with a real person.

This serves to compensate for the disadvantage of computer operation, which is still unfamiliar and difficult to use for ordinary users in spite of the advent of the graphical user interface (GUI). The term "virtual pseudo-human figure" as used here refers not only to figures looking like humans but also to other animals and imaginary creatures which are personified.

Examples of the prior art using such virtual pseudo-human figures for user interfacing include the "information input apparatus" disclosed in the Japanese Patent Application Laid-open No. Hei-3-215891. According to this technique, in operating a video cassette recorder or the like, a personified guiding character is displayed, who acts or gives facial expressions according to the content to be displayed by the apparatus. Besides that, the "input display apparatus" described in the Japanese Patent Application Laid-open No. Hei-6-202831 is made easy and pleasant to operate with natural feeling by displaying on a touch panel a character who is, as it were, the second self of the user. Furthermore, the "communication interface system" disclosed in the Japanese Patent Application Laid-open No. Hei-8-106374 facilitates the exchange of information between the human and the computer system by providing means to determine appropriate speech and images with which the computer system is to respond according to the relative age and sex of the customer. In addition, the "automatic diagnosis display apparatus" described in the Japanese Patent Application Laid-open No. Sho-60-157693 displays the overall diagnosis in the expressions and colors of a human face or the face of a personified non-human creature or object. Although these techniques use acting virtual pseudo-human figures as user interfaces, those virtual pseudo-human figures are generated for limited objects in limited situations of use, and it is difficult to accomplish general-purpose generation of human images responsive to any situation that may arise.

Meanwhile, known systems for generating virtual pseudo-human figures include the "human bodily motion visualizing system" described in the Japanese Patent Application Laid-open No. Hei-7-44726 by the present applicant, according to which specific motion patterns of a virtual pseudo-human figure generated by computer graphics are selected and they are combined to simulate human motions.

Figure 9:
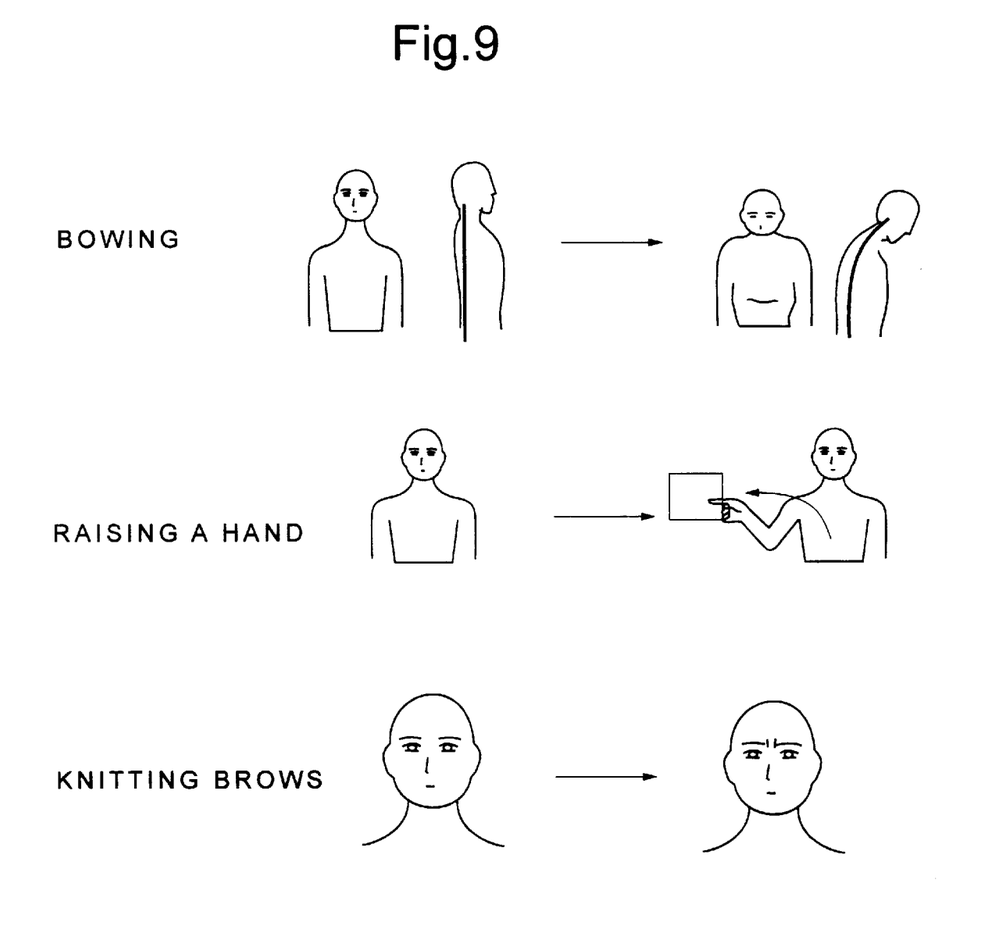
FIG. 9 illustrates an example of motion pattern according to the prior art.
Figure 10:
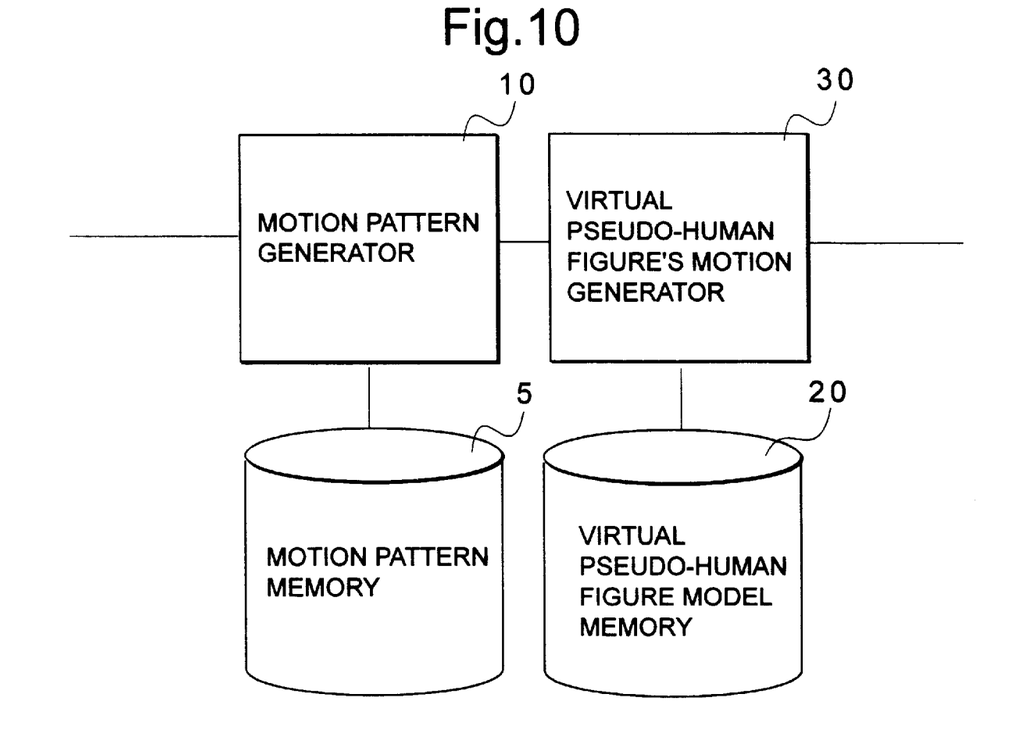
FIG. 10 is a block diagram illustrating the configuration of a virtual pseudo-human figure generating system according to the prior art.

The motion patterns referred to here are, as shown in FIG. 9, such as "bowing," "raising a hand" and "knitting brows" in a classification of basic human motions. The configuration of this virtual pseudo-human figure generating system is illustrated in FIG. 10. When an acting instruction is given from outside, a motion pattern generator 10 reads out of a motion pattern memory 5 a motion pattern corresponding to the content of the acting instruction. For instance, if an instruction to "greet" is received, a motion pattern of "inclining forward" will be read out.

Figure 11:
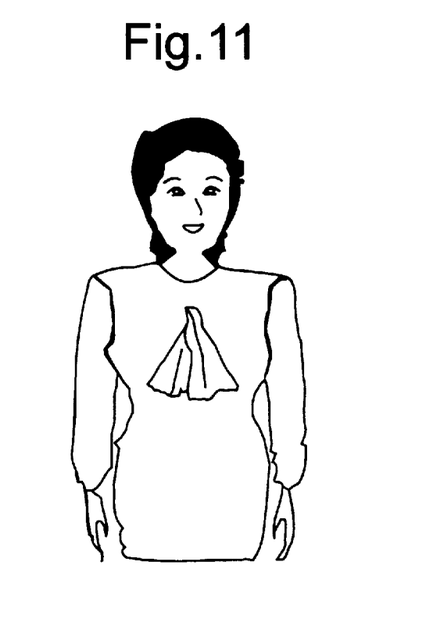
FIG. 11 illustrates an example of virtual pseudo-human figure model.

The motion pattern read out is delivered to a virtual pseudo-human figure motion generator 30, which causes a virtual pseudo-human figure model to move on the basis of the delivered motion pattern. The virtual pseudo-human figure is generated by using model data stored in a virtual pseudo-human figure model memory 20. The virtual pseudo-human figure model is a polyhedron generated by computer graphics, with a backbone, neck, head, hands and other constituents connected by a plurality of joints. For instance, a model from the waist up, as shown in FIG. 11, is conceivable. This model consists of two arms each having three joints of wrist, elbow and shoulder, and a backbone which can bend at the belly, chest and neck.

However, the above-described virtual pseudo-human figure generating system according to the prior art involves the following problems.

A first problem is that, because there are available only such basic patterns as "bowing," "raising a hand" and "knitting brows," there is no continuity between different motion patterns. As one can see from real human motions, motions constitute a smooth flow. When shifting from pattern A to pattern B, the shift to the next motion does not take place abruptly. Between patterns A and B, there always is an intermediate pattern to facilitate the shift. For instance in a sequence of motions of "beginning to walk after bowing," there is required between the "bowing" motion and the "walking" motion a motion to "raise the head," which is the aforementioned intermediate pattern to facilitate the shift. Thus, in spite of the fact that, when a person acts, it must be a smoothly continuing sequence of motion patterns, any conventional virtual pseudo-human figure generating system involves the problem that motion patterns do not smoothly continue from one to next.

A second problem is that, when no acting instruction is given from outside, the virtual pseudo-human figure model is in a completely static state. In a situation of dialogue, it is natural for the participants to be always moving somehow or other if only slightly. Thus a model not moving at all is extremely unnatural. Here, such slight motions may be referred to as "idling." For instance, it refers to one "moving his or her head and body slightly while listening to somebody else." If a real person is listening, basically, it may be rare for the listener to make some positive motion for communication, but it may be as rare for him or her not to move at all. Any conventional virtual pseudo-human figure generating system keeps the figure completely still as in the latter case of the foregoing sentence, but there is no instance in which "idling" is realized.

A third problem is that, because the motion patterns are formalized, it is impossible to generate characteristic motions matching the attributes of the model. The virtual pseudo-human figure model can have one of many different forms. It may look closely like a real human, or be a deformation of an animal shape or a fictitious pseudo-human figure never looking like a real human. While the model should always act according to motion patterns, it may be necessary to limit the available range of motions or add unique motions according to the type of model. For instance in a motion expressing joy, it may be enough for the model of an adult just to "smile," but a child model should also "jump." Generation of such motions dependent on the attributes of the model has not been achieved by the prior art.

Figure 12A:
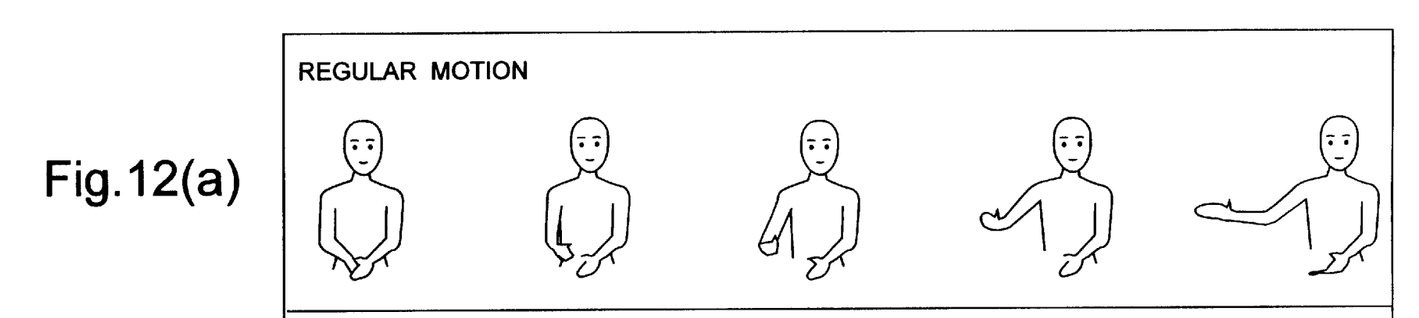
FIGS. 12(a) and 12(b) illustrates examples of motion pattern of "holding out a hand" by an example of virtual pseudo-human figure model.
Figure 12B:
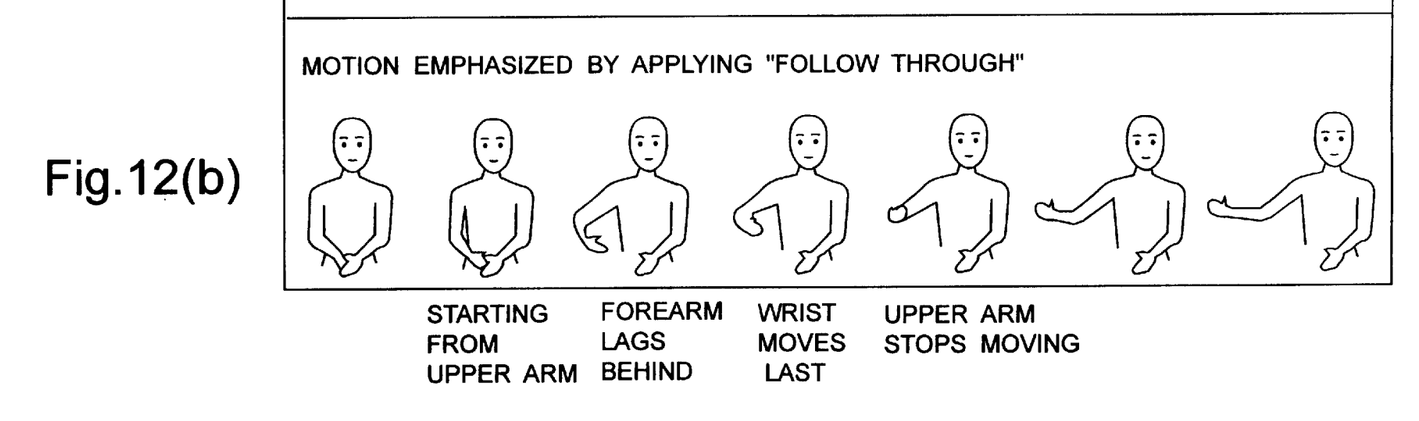

A fourth problem is the impossibility to accentuate communication with emphatic gestures because the motion patterns are formalized. It may be sometimes desired to accentuate a motion pattern by varying the speed or locus of the motion involved. For instance, as illustrated in FIG. 12, the same motion of "holding out a hand" can conceivably be done in one of two ways, as in FIG. 12(a) or (b). One may simply hold out one's hand as in FIG. 12(a) or let the hand move in a greater locus as in FIG. 12(b). The latter accentuates the act of holding out one's hand in an attempt to make the communication more effective. No embodiment of the prior art has means to accentuate a motion in such a way.

The object of the present invention, therefore, to solve the problems pointed out above, and provide a virtual pseudo-human figure generating system capable of generating a virtual pseudo-human figure acting in a more natural manner.

SUMMARY OF THE INVENTION

A virtual pseudo-human figure generating system according to the invention has, in order to solve the first of the above-described problems, an intermediate motion pattern generator for generating a motion between one motion pattern and the next.

The intermediate motion pattern can be determined by calculation on the basis of the ending position of one motion pattern and the starting position of the next, or may be an intermediate motion pattern stored as such in advance in an intermediate motion pattern memory.

The virtual pseudo-human figure generating system according to the invention has, in order to solve the second of the above-described problems, an idling motion pattern generator for generating an idling motion. The idling motion pattern generator reads out, in the absence of an acting instruction for a certain period of time, an idling motion pattern stored in an idling motion pattern memory, and the model then continues the idling motion until the next acting instruction comes. @@ Moreover, the virtual pseudo-human figure generating system@according to the invention has, in order to solve the third of the@above-described problems, a model-by-model motion pattern generator for adding or replacing a motion pattern according to an attribute of the model. A model-by-model motion pattern is stored into a model-by-model motion pattern memory, out of which motions unique to each virtual pseudo-human figure model are read and applied to each virtual pseudo-human figure model. The model is thereby enabled to perform unique motions, which cannot be expressed by the conventional basic motion patterns.

Furthermore, the virtual pseudo-human figure generating system according to the invention has, in order to solve the fourth of the above-described problems, a motion corrector capable of altering the locus or speed of a motion. The motion corrector delivers to a motion pattern generator an instruction to expand the locus of a movement or an instruction to vary the speed of a motion.

DETAILED DESCRIPTION OF THE PREFERRED EMBODIMENT

Preferred embodiments of the present invention will be described in detail below.

To begin with, a first preferred embodiment of the invention will be described in detail with reference to drawings.

Figure 1:
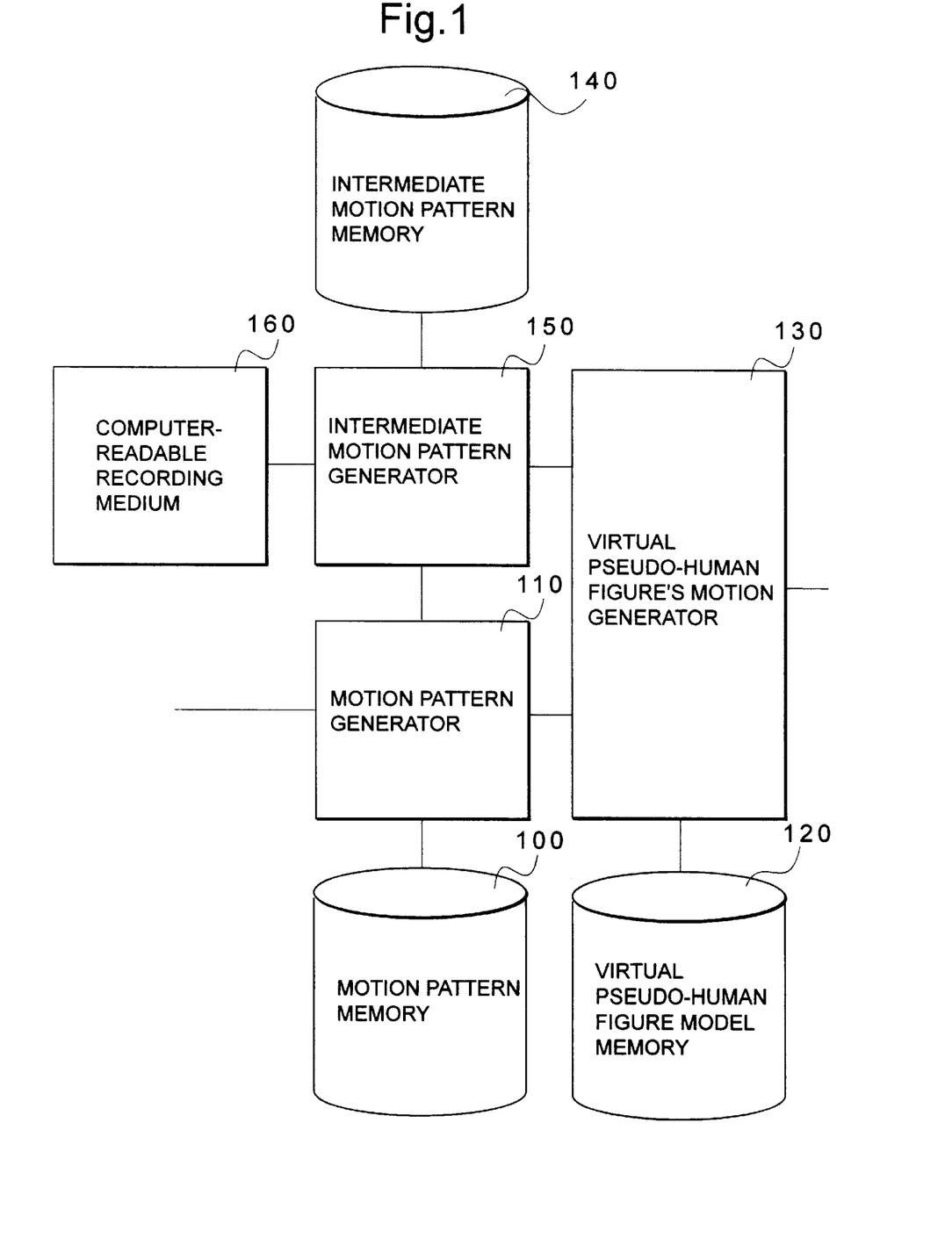
FIG. 1 is a block diagram illustrating the configuration of a first preferred embodiment of the present invention.

FIG. 1 is a block diagram illustrating the configuration of the first embodiment of the invention.

This first embodiment consists of a motion pattern memory 100, a motion pattern generator 110, a virtual pseudo-human figure model memory 120, a virtual pseudo-human figure's motion generator 130, an intermediate motion pattern memory 140, and an intermediate motion pattern generator 150. Of these constituent elements, two are unique to the present invention, including the intermediate motion pattern memory 140 and the intermediate motion pattern generator 150, and the rest are structured similarly to the corresponding means in the above-described virtual pseudo-human figure generating system according to the prior art.

When an acting instruction comes from outside, the motion pattern generator 110 reads out of the motion pattern memory 100 a motion pattern corresponding to the content of the acting instruction. For instance, if an acting instruction to "greet" comes, it will read out a motion pattern of "inclining forward." The motion pattern which has been read out is delivered to the virtual pseudo-human figure's motion generator 130, which causes the virtual pseudo-human figure to move in the delivered motion pattern. The virtual pseudo-human figure is generated by using model data stored in the virtual pseudo-human figure model memory 120. Incidentally, the aforementioned motion pattern and virtual pseudo-human figure model are similar to those described with reference to the prior art.

In order to cause said model to move in said motion patterns, it is necessary to decompose each motion pattern into specific numerical data regarding the positions, moving directions, moving angles and the like of the model's joints.

In the process of this embodiment to express a motion of a virtual pseudo-human figure model, the intermediate motion pattern generator 150 further reads out of the intermediate motion pattern memory 140 an intermediate motion pattern for smoothly linking one motion pattern to the next. As an equal number of intermediate motion patterns as the number of pairs of basic motion patterns are stored in the intermediate motion pattern memory 140, each as the pattern of an intermediate motion which occurs when a shift takes place from a basic motion pattern to another, the intermediate motion pattern generator 150 retrieves for its use the necessary one out of the intermediate motion patterns stored therein.

Each constituent unit will now be described in detail below.

Figure 2:
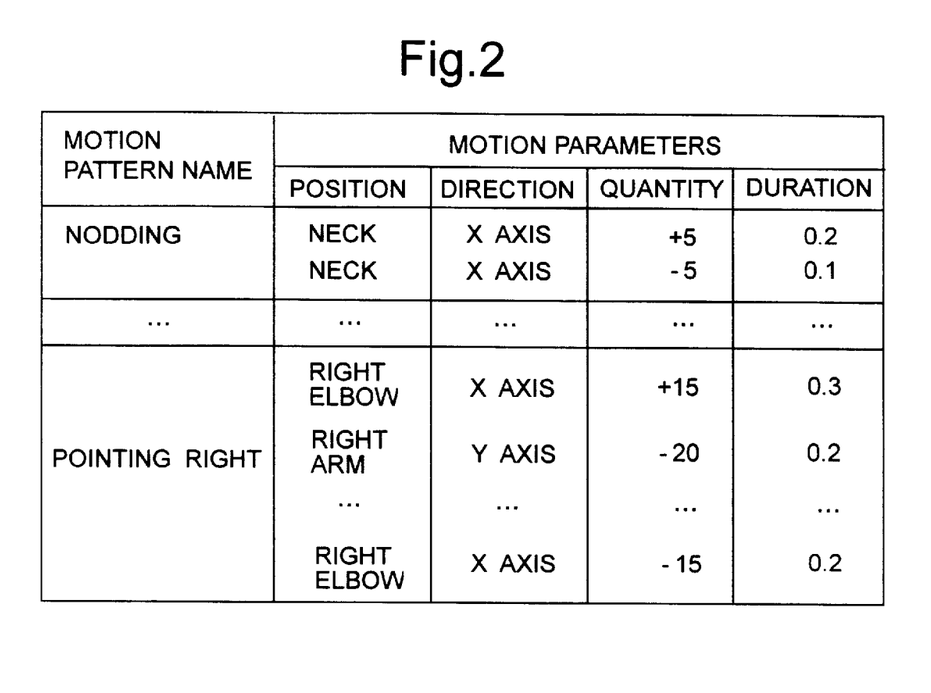
FIG. 2 illustrates an example of defined motion pattern in the first preferred embodiment of the invention.

The motion pattern memory 100 will be described first. In this motion pattern memory 100, which defines motion patterns for generating physical expressions of a pseudo-human figure, the defined motion patterns are stored. The motion patterns express typical human motions which are appropriately classified. Each motion pattern is denoted by a motion pattern name and motion parameters. FIG. 2 illustrates an example of defined motion pattern. Here, "nodding" and "pointing right" are motion pattern names. Action parameters define a set of the moving direction and quantity, the duration of the motion and other factors of each position of the pseudo-human figure. For instance, the motion pattern of "nodding" in FIG. 2 is denoted by a set of a motion to shift the position called "neck" by +5 units of quantity in the direction of the "X axis" in 0.2 unit of duration and another motion to shift the "neck" by −5 units of quantity in the direction of the "X axis" in 0.1 unit of duration.

The motion pattern generator 110, when receiving an acting instruction from outside the virtual pseudo-human figure generating system, by input from the user, a computer or otherwise, reads out of the motion pattern memory 100 a motion pattern corresponding to the content of the acting instruction, and delivers the motion pattern which has been read out to the virtual pseudo-human figure's motion generator 130 and the intermediate motion pattern generator 150.

Now will be described the virtual pseudo-human figure model memory 120, in which model data for generating expressions of the appearance of a virtual pseudo-human figure are stored.

Next will be described the virtual pseudo-human figure's motion generator 130, into which model data stored in the virtual pseudo-human figure model memory 120 are read according to the contents of the motion pattern generator 110 and the intermediate motion pattern generator 150 to generate a virtual pseudo-human figure and its motions. The model data constitute a polyhedron generated by computer graphics, consisting of a backbone, neck, head, hands and other bodily parts connected to one another by a plurality of joints.

Figure 3:
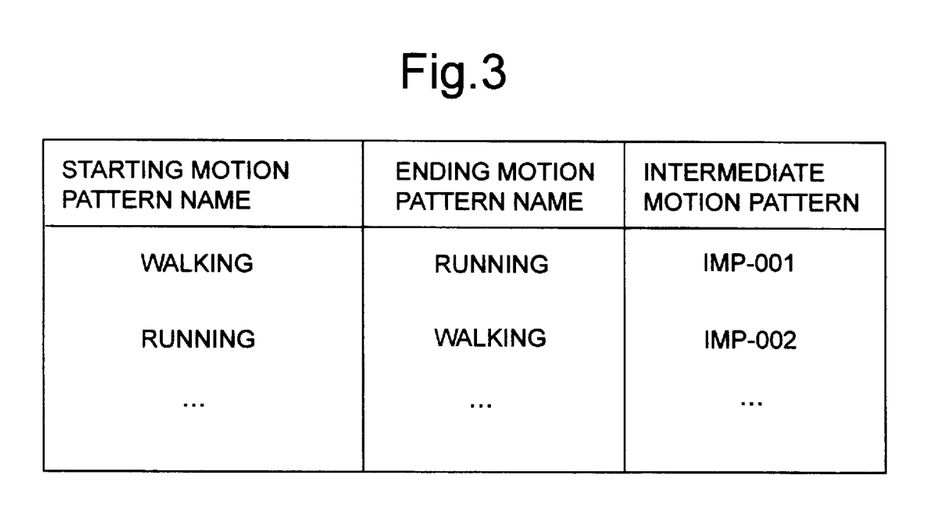
FIG. 3 illustrates an example of intermediate motion pattern in the first preferred embodiment of the invention.

Now will be described the intermediate motion pattern memory 140, which stores intermediate motion patterns, each for generating a pattern between one motion pattern and the next. For instance in FIG. 3, "IMP-001" is stated as intermediate motion pattern in shifting from a motion pattern of "walking" to one of "running." "IMP-001" denotes in motion parameters a motion for smoothly expressing the shift from the walking motion to the running motion. Also, as intermediate motion pattern in shifting from a motion pattern of "running" to one of "walking," "IMP-002" is stated. "IMP-002" denotes in motion parameters the motion for smoothly expressing the shift from the running motion to the walking motion.

Next will be described the intermediate motion pattern generator 150, which reads out of the intermediate motion pattern generator 140 an intermediate motion pattern corresponding to a pair of motion patterns generated by the motion pattern generator 110. Here, if a corresponding motion pattern is found, the virtual pseudo-human figure's motion generator 130 will generate an action of the virtual pseudo-human figure on the basis of the sequence of motion patterns resulting from the insertion of the intermediate motion pattern generated by the intermediate motion pattern generator 150 into the pair of motion patterns generated by the motion pattern generator 110. Or, if no corresponding intermediate motion pattern is found, the virtual pseudo-human figure's motion generator 130 will generate an action of the virtual pseudo-human figure on the basis of the motion patterns generated by the motion pattern generator 110 alone.

The intermediate motion pattern generator 150 as described above is merely an example, and the present invention is not limited to this example alone. For instance, an intermediate motion may be generated automatically on the basis of the motion ending position of one motion pattern and the motion starting position of the next.

Thus the first preferred embodiment of the invention solves the first of the aforementioned problems because it is provided with an intermediate motion pattern generator for generating an intermediate motion pattern between one motion pattern and the next and thereby smoothes the continuity between the two motion patterns.

Next, a second preferred embodiment of the present invention will be described in detail with reference to drawings.

Figure 4:
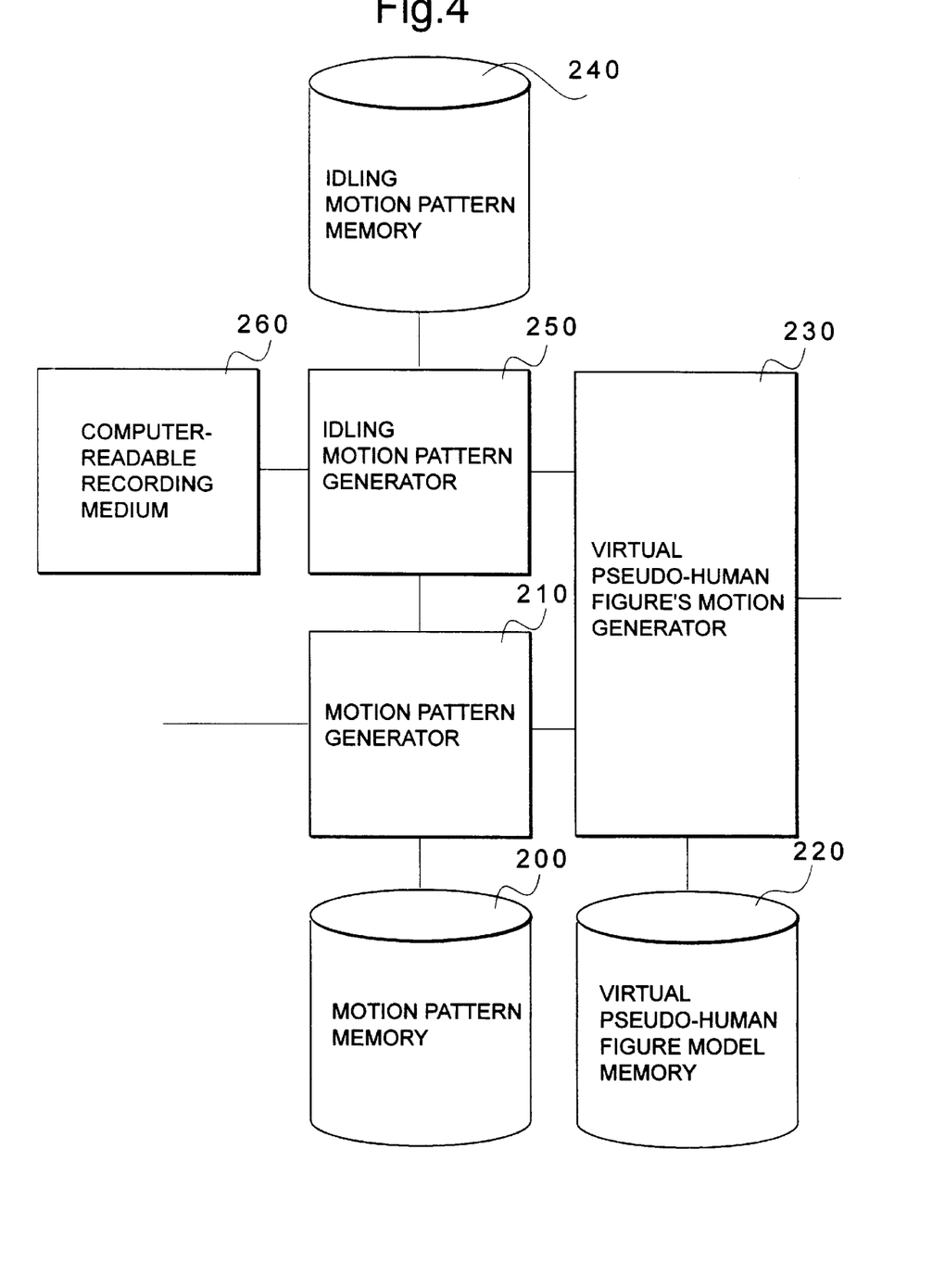
FIG. 4 illustrates the configuration of a second preferred embodiment of the invention.

FIG. 4 is a block diagram illustrating the configuration of the second embodiment of the invention.

This second embodiment consists of a motion pattern memory 200, a motion pattern generator 210, a virtual pseudo-human figure model memory 220, a virtual pseudo-human figure's action generator 230, an idling motion pattern memory 240 and an idling motion pattern generator 250. Of these constituent elements, two are unique to the present invention, including the idling motion pattern memory 240 and the idling motion pattern generator 250, and the rest are structured similarly to the corresponding means in the above-described virtual pseudo-human figure generating system according to the prior art.

When an acting instruction comes from outside, the motion pattern generator 210 reads out of the motion pattern memory 200 a motion pattern corresponding to the content of the acting instruction. For instance, if an acting instruction to "greet" comes, it will read out a motion pattern of "inclining forward." The motion pattern which has been read out is delivered to the virtual pseudo-human figure's motion generator 230, which causes the virtual pseudo-human figure to move in the delivered motion pattern. The virtual pseudo-human figure is generated by using model data stored in the virtual pseudo-human figure model memory 220. Incidentally, the aforementioned motion pattern and virtual pseudo-human figure model are similar to those described with reference to the prior art.

In order to cause said model to move in said motion patterns, it is necessary to decompose each motion pattern into specific numerical data regarding the positions, moving directions, moving angles and the like of the model's joints.

In the process of this embodiment to express a motion of a virtual pseudo-human figure model, if the generation of a motion pattern by the motion pattern generator 210 does not take place for a certain period of time, the idling motion pattern generator 250 reads out of the idling motion pattern memory 240 an idling motion pattern at random. However, when the generation of a motion pattern by the motion pattern generator 210 is resumed, the idling motion pattern generator 250 immediately stops generating the idling motion pattern.

The timing of the generation of an idling motion pattern as described above is merely an example, and the present invention is not limited to this example alone. The essential point is that it is intended to use, if the virtual pseudo-human figure does not move for a certain period of time, an idling motion pattern to cause the virtual pseudo-human figure model to move in that pattern. No particular idling motion is specified here according to the invention. For instance, if the virtual pseudo-human figure model, when listening to someone else, slightly moves its head and body, the user can converse with the model more smoothly.

Thus the second preferred embodiment of the invention solves the second of the aforementioned problems because it has the idling motion pattern generator for generating an idling motion pattern, which, if the virtual pseudo-human figure does not move for a certain period of time, can cause the virtual pseudo-human figure model to act more naturally by having the virtual pseudo-human figure model, which otherwise would be completely still, to show some action or other by an idling motion.

Next, a third preferred embodiment of the invention will be described in detail with reference to drawings.

Figure 5:
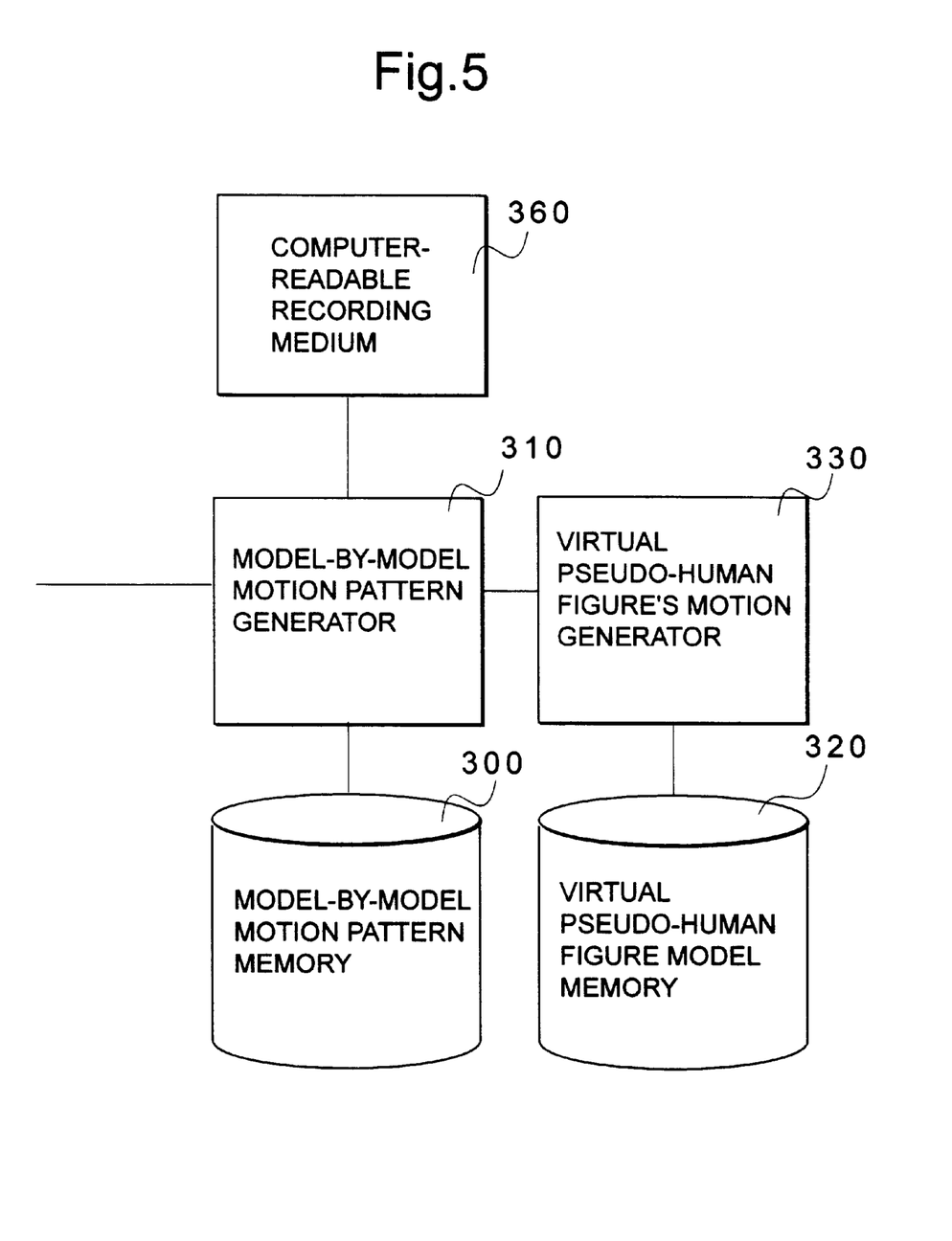
FIG. 5 illustrates the configuration of a third preferred embodiment of the invention.

FIG. 5 is a block diagram illustrating the configuration of the third embodiment of the invention.

This third embodiment consists of a model-by-model motion pattern memory 300, a model-by-model motion pattern generator 310, a virtual pseudo-human figure model memory 320, and a virtual pseudo-human figure's motion generator 330. Of these constituent elements, two are unique to the present invention, including the model-by-model motion pattern memory 300 and the model-by-model motion pattern generator 310, and the rest are structured similarly to the corresponding means in the above-described virtual pseudo-human figure generating system according to the prior art.

When an acting instruction comes from outside, the model-by-model motion pattern generator 310 reads out of the model-by-model motion pattern memory 300 a motion pattern corresponding to the content of the acting instruction. For instance, if an acting instruction to "greet" comes, it will read out a motion pattern of "inclining forward." The motion pattern which has been read out is delivered to the virtual pseudo-human figure's motion generator 330, which causes the virtual pseudo-human figure to move in the delivered motion pattern. The virtual pseudo-human figure is generated by using model data stored in the virtual pseudo-human figure model memory 320. Incidentally, the aforementioned motion pattern and virtual pseudo-human figure model are similar to those described with reference to the prior art.

In order to cause said model to move in said motion patterns, it is necessary to decompose each motion pattern into specific numerical data regarding the positions, moving directions, moving angles and the like of the model's joints.

Each constituent unit will now be described in detail below.

Figure 6:
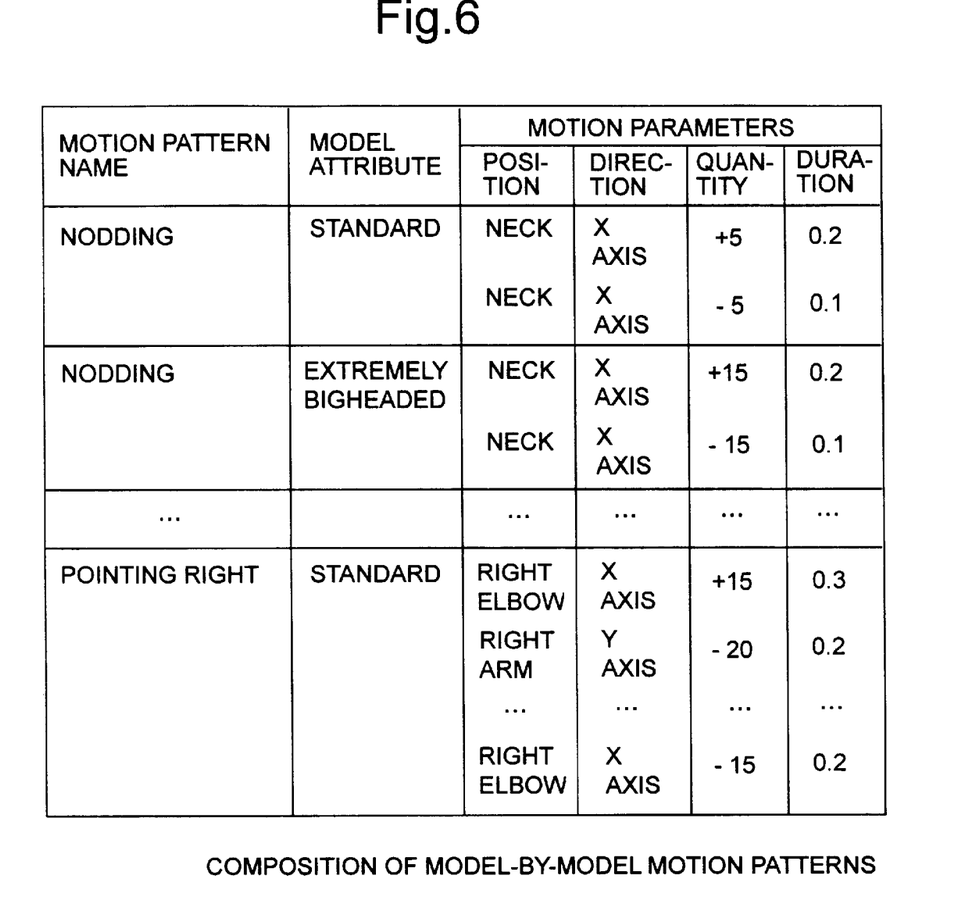
FIG. 6 illustrates an example of model-by-model motion pattern in the third preferred embodiment of the invention.

The model-by-model motion pattern memory 300 will be described first. In this model-by-model motion pattern memory 300, which defines motion patterns for generating physical expressions of a pseudo-human figure, the defined motion patterns are stored. The motion patterns express typical human motions which are appropriately classified. Each motion pattern is denoted by a motion pattern name, a model attribute and motion parameters. FIG. 6 illustrates an example of defined motion pattern. Here, "nodding" and "pointing right" are motion pattern names. Model attributes are defined to cause each virtual pseudo-human figure model to move in its unique way. Expressions of model attributes include, for example, extremely big-headed, well-proportioned, male, female, infantile and old-aged. Even from a motion pattern read out under the same motion pattern name, if the model attribute differs, a different motion is generated. In the example shown in FIG. 6, a motion pattern under the same name of "nodding" is defined to differ in shifting quantity, depending on whether the model attribute is "standard" or "extremely big-headed." As a result, the "nodding" motion by an "extremely big-headed" virtual pseudo-human figure model is expressed as a bigger motion than that of a "standard" virtual pseudo-human figure model. Action parameters define a set of the moving direction and quantity, the duration of the motion and other factors of each position of the pseudo-human figure. For instance, the motion pattern of "nodding" in FIG. 6 is denoted by a set of a motion, if the model attribute is "standard," to shift the position called "neck" by +5 units of quantity in the direction of the "X axis" in 0.2 unit of duration and another motion to shift the "neck" by −5 units of quantity in the direction of the "X axis" in 0.1 unit of duration.

The model-by-model motion pattern generator 310, when receiving an acting instruction from outside the virtual pseudo-human figure generating system, by input from the user, a computer or otherwise, reads out of the model-by-model motion pattern memory 300 a motion pattern corresponding to the content of the acting instruction, and delivers the motion pattern which has been read out to the virtual pseudo-human figure's motion generator 330.

Now will be described the virtual pseudo-human figure model memory 320, in which model data for generating expressions of the appearance of a virtual pseudo-human figure are stored.

Next will be described the virtual pseudo-human figure's motion generator 330, into which model data stored in the model-by-model motion pattern memory 300 are read according to the contents of the model-by-model motion pattern generator 310 to generate a virtual pseudo-human figure and its motions. The model data constitute a polyhedron generated by computer graphics, consisting of a backbone, neck, head, hands and other bodily parts connected to one another by a plurality of joints. The model-by-model motion pattern as described above is merely an example. If, for instance, the gender attribute of the virtual pseudo-human figure model to be generated, male or female, is taken into consideration, a motion parameter may be varied according to that attribute by assigning 1.25 units for a male, or 0.75 unit for a female, to the moving quantity.

Thus the third preferred embodiment of the invention solves the third of the aforementioned problems because it is provided with a model-by-model motion pattern generator for adding or replacing a unique motion matching the attribute of the model.

Although the first through third preferred embodiments of the present invention have so far been described separately, either any two or all of the three embodiments can as well be combined.

Next, a fourth embodiment of the invention will be described in detail with reference to drawings.

Figure 7:
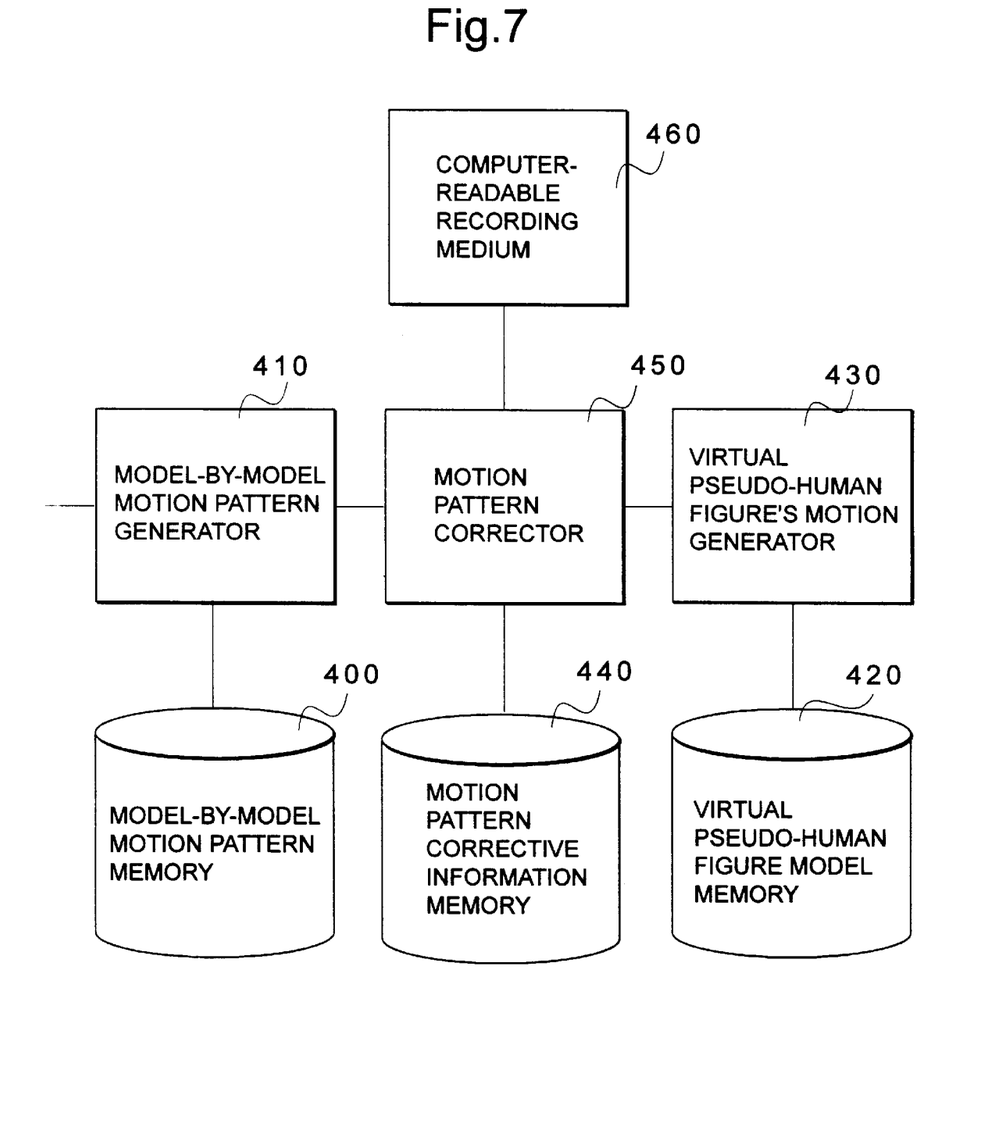
FIG. 7 illustrates the configuration of a fourth preferred embodiment of the invention.

FIG. 7 is a block diagram illustrating the configuration of the fourth embodiment of the invention.

This fourth embodiment consists of a model-by-model motion pattern memory 400, a model-by-model motion pattern generator 410, a virtual pseudo-human figure model memory 420, a virtual pseudo-human figure's action generator 430, a motion pattern corrective information memory 440 and a motion pattern corrector 450. Of these constituent elements, two are unique to the present invention, including the motion pattern corrective information memory 440 and the motion pattern corrector 450, and the rest are structured similarly to the corresponding means in the above-described third embodiment of the invention.

The model-by-model motion pattern generator 410, when receiving an acting instruction from outside, reads out of the model-by-model motion pattern memory 400 a motion pattern corresponding to the content of the acting instruction. For instance, if an acting instruction to "greet" comes, it will read out a motion pattern of "inclining forward." The motion pattern which has been read out is delivered to the motion pattern corrector 450 so that all the motion patterns be corrected. The motion patterns are corrected by using corrective information stored in the motion pattern corrective information memory 440. However, if no instruction to correct any motion comes from outside, no motion pattern correction will take place. The motion pattern is delivered to the virtual pseudo-human figure's motion generator 430, which causes the virtual pseudo-human figure to move in the delivered motion pattern. The virtual pseudo-human figure is generated by using model data stored in the virtual pseudo-human figure model memory 420. Incidentally, the aforementioned motion pattern and virtual pseudo-human figure model are similar to those described with reference to the prior art.

Figure 8:
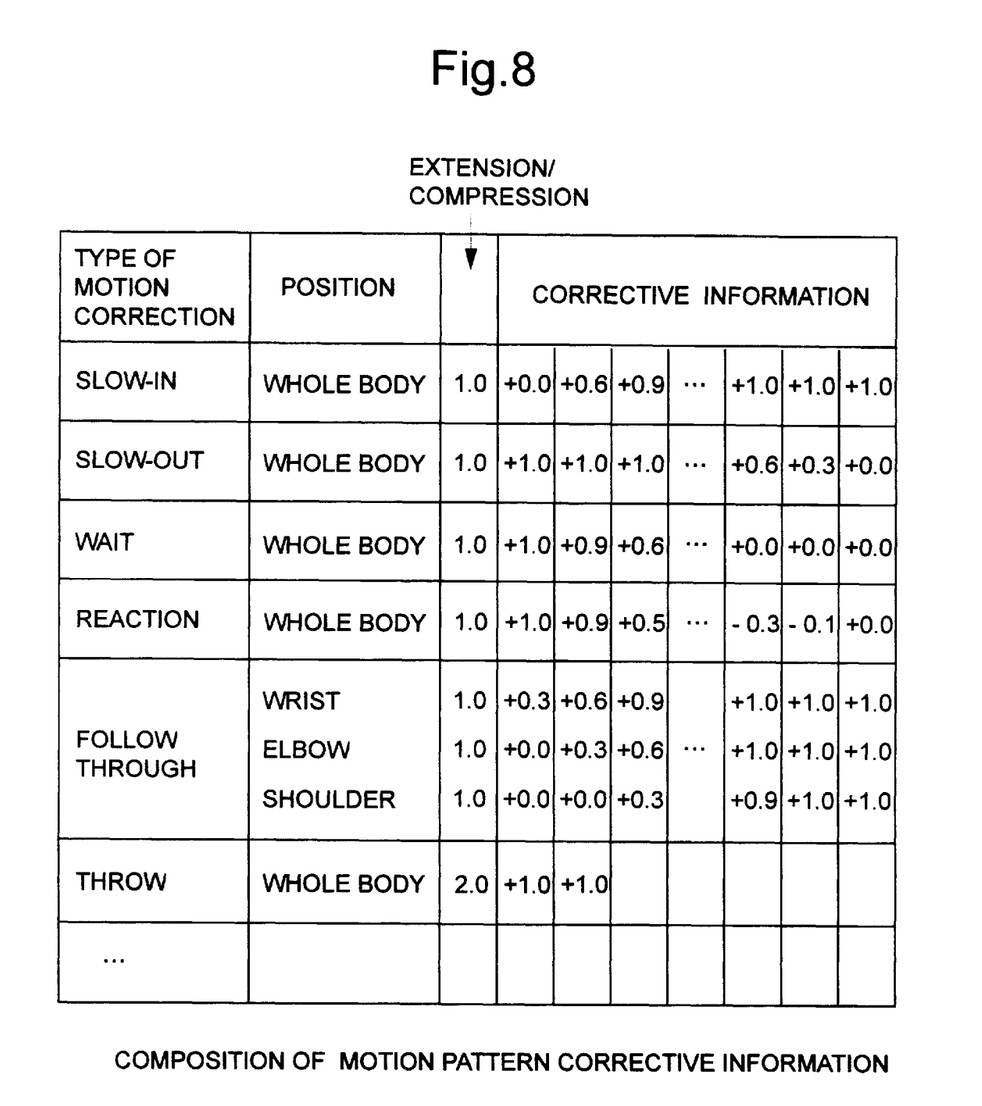
FIG. 8 illustrates examples of motion pattern corrective information in the fourth preferred embodiment of the invention.

In order to cause said model to move in said motion patterns, it is necessary to decompose each motion pattern into specific numerical data regarding the positions, moving directions, moving angles and the like of the model's joints. Now will be described the motion pattern corrective information memory 440, which stores necessary information for applying such corrections as replacement, emphasis and suppression, to all the motion patterns for expressing the motions of a pseudo-human figure. FIG. 8 illustrates examples of definition of motion pattern corrective information. Here "slow in," "wait" and so forth are "types of motion correction," according to which instructions to correct motions from outside are accomplished. "Positions" refer to the extents in which motion patterns are corrected. If the position is "whole body," all the motions of the pseudo-human figure will be corrected. Each figure under "extension/compression" is a coefficient by which the length of time required for a given motion is extended or compressed. If the coefficient is 1.0, there will be no change in the length of time required for the motion, but if it is 2.0, the length of time will be doubled. Each item of "corrective information" is a coefficient representing the ratio of the speed of a given position of the pseudo-human figure model after the lapse of each unit of time to the speed of that before the correction. Where the coefficient is +1.0 no correction is made. Where the coefficient is +0.5, the position concerned moves at half the speed of the same position before the correction, or where the coefficient is +0.0, the position concerned does not move. However, since the time required for a motion differs from one motion pattern to another, it is desirable to normalize corrective information when it is applied so that it can satisfy the requirement for the length of time for the motion represented by the motion pattern. Now will be described the motion pattern corrector 450, which, when receiving an instruction to correct a motion from outside the virtual pseudo-human figure generating system, by input from the user, a computer or otherwise, reads out of the motion pattern corrective information memory 440 motion pattern corrective information corresponding to the content of the instruction to correct a motion, corrects the motion pattern read out of the model-by-model motion pattern generator 410, and delivers the corrected motion pattern to the virtual pseudo-human figure's motion generator 430.

Thus the fourth preferred embodiment of the present invention solves the fourth of the aforementioned problems because it is provided with a motion pattern corrector for varying the speed and other factors of the motions of the virtual pseudo-human figure model.

Although the fourth embodiment of the invention has been described with reference to a configuration in which the third embodiment is augmented with the motion pattern corrector 450 and the motion pattern corrective information memory 440, this configuration is merely an example, and the fourth embodiment is applicable not only to the third embodiment. It is evident that the fourth embodiment can as well be applied to the aforementioned virtual pseudo-human figure generating system according to the prior art, and to the first and second embodiments of the present invention. Incidentally, if the fourth embodiment is applied, the "intermediate motion patterns" in the first embodiment and the "idling motion patterns" in the second embodiment will also be included in the objects of correction by the action pattern corrector 450.

Furthermore, in the first through fourth embodiments described above, they may as well be respectively provided with computer-readable media 160, 260, 360 and 460 recording virtual pseudo-human figure generating programs as shown in FIGS. 1, 2, 5 and 7. In these cases, the intermediate motion pattern generator 150, the idling motion pattern generator 250, the model-by-model motion pattern generator 360 and the motion pattern corrector 460 will operate in respectively the same manners as the corresponding means in the aforementioned first, second, third and fourth embodiments under the control of the virtual pseudo-human figure generating programs recorded in the computer-readable media 160, 260, 360 and 460, respectively. Incidentally, these recording media 160, 260, 360 and 460 may be magnetic disks, semiconductor memories, or any other appropriate computer-readable recording media.

As hitherto described, by using a virtual pseudo-human figure provided by a virtual pseudo-human figure generating system according to the present invention, a highly user-friendly interface can be realized for computers.

What is claimed is:

1. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "male" and "female" which represent the movements of male and female humans respectively; and a virtual pseudo-human figure's motion generator for causing the virtual pseudo-human figure model to perform motions according to its model attributes on the basis of motion patterns stored in said model-by-model motion pattern memory.

2. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "male" and "female" which represent the movements of male and female humans respectively;

a virtual pseudo-human figure model memory for storing information for generating said virtual pseudo-human figure model;

a virtual pseudo-human figure's motion generator for causing the virtual pseudo-human figure model to perform motions according to its model attributes on the basis of information stored in said virtual pseudo-human figure model memory; and a model-by-model motion pattern generator for reading out of said model-by-model motion pattern memory, when a motion pattern is instructed from outside, the motion pattern according to model attributes of the virtual pseudo-human figure model generated by said virtual pseudo-human figure's motion generator, wherein said virtual pseudo-human figure's motion generator causes the virtual pseudo-human figure model to move in accordance with a motion pattern read out by said model-by-model motion pattern generator.

3. A virtual pseudo-human figure generating system, as claimed in claim 2, further comprising:

a motion pattern corrective information memory for storing corrective information for correcting motion patterns; and a motion pattern corrector for delivering to said virtual pseudo-human figure's generator a motion pattern or patterns read out by said model-by-model motion pattern generator after correcting the motion pattern or patterns on the basis of corrective information stored in said motion pattern corrective information memory.

4. A method used in a virtual pseudo-human figure generating system for generating a virtual pseudo-human figure model on a display apparatus and causing said virtual pseudo-human figure model to move on the display apparatus in accordance with motion patterns describing the motions of its different positions, comprising:

storing in a memory, as classified by model attributes, motion patterns that express the motions of said virtual pseudo-human figure model corresponding to movements designated "male" and "female" which represent the movements of male and female humans respectively; and causing the virtual pseudo-human figure model to move in accordance with its model attribute on the basis of a motion pattern stored in said memory.

5. A method, as claimed in claim 4, further comprising:
storing in a memory corrective information for correcting motion patterns; and
adopting newly as a motion pattern or patterns said read-out motion pattern or patterns corrected on the basis of corrective information stored in said memory.

6. A computer-readable medium having a program recorded thereon which, when a virtual pseudo-human figure model is generated on a display apparatus and said virtual pseudo-human figure model is caused to move on the display apparatus in accordance with motion patterns describing the motions of its different positions, causes a computer:

to store in a memory, as classified by model attributes, motion patterns that express the motions of said virtual pseudo-human figure model corresponding movements designated "male" and "female" which represent the movements of male and female humans respectively; and to have the virtual pseudo-human figure model move in accordance with its model attribute on the basis of a motion pattern stored in said memory.

7. A computer-readable medium having a program recorded thereon, as claimed in claim 6, wherein said program further causes the computer:

to store in a memory corrective information for correcting motion patterns; and to adopt newly as a motion pattern or patterns motion said read-out pattern or patterns corrected on the basis of corrective information stored in said memory.

8. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "extremely big-headed" and "well-proportioned which represent the movements of extremely big-headed and well-proportioned models respectively; and a virtual pseudo-human figure's motion generator for causing the virtual pseudo-human figure model to perform motions according to its model attributes on the basis of motion patterns stored in said model-by-model motion pattern memory.

9. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "extremely big-headed" and "well-proportioned" which represent the movements of extremely big-headed, and well-proportioned models respectively;

a virtual pseudo-human figure model memory for storing information for generating said virtual pseudo-human figure model;

a virtual pseudo-human figure's motion generator for causing the virtual pseudo-human figure model on the basis of information stored in said virtual pseudo-human figure model memory; and a model-by-model motion pattern generator for reading out of said model-by-model motion pattern memory, when a motion pattern is instructed from outside, the motion pattern according to model attributes of the virtual pseudo-human figure model generated by said pseudo-human figure's motion generator, wherein said virtual pseudo-human figure's motion generator causes the virtual pseudo-human figure model to move in accordance with a motion pattern read out by said model-by-model motion pattern generator.

10. A method used in a virtual pseudo-human figure generating system for generating a virtual pseudo-human figure model on a display apparatus and causing said virtual pseudo-human figure model to move on the display apparatus in accordance with motion patterns describing the motions of its different positions, comprising:

storing in a memory, as classified by model attributes, motion patterns that express the motions of said virtual pseudo-human figure model corresponding to movements designated "extremely big-headed" and "well-proportioned" which represent the movements of extremely big-headed and well-proportioned models respectively; and causing the virtual pseudo-human figure model to move in accordance with its model attribute on the basis of a motion pattern stored in said memory.

11. A computer-readable medium having a program recorded thereon which, when a virtual pseudo-human figure model is generated on a display apparatus and said virtual pseudo-human figure is caused to move on the display apparatus in accordance with motion patterns describing the motions of its different positions, causes a computer:

to store in a memory, as classified by model attributes, motion patterns that express the motions of said virtual pseudo-human figure model corresponding to movements designated "extremely big-headed" and "well-proportioned" which represent the movements of extremely big-headed and well-proportioned models respectively; and to have the virtual pseudo-human figure model to move in accordance with its model attribute on the basis of a motion pattern stored in said memory.

12. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "infantile" and "old-aged" which represents the movements designated "infantile" and "old-aged" which represent the movements of infantile and old-aged" humans respectively; and a virtual pseudo-human figure's motion generator for causing the virtual pseudo-human figure model to perform motions according to its model attributes on the basis of motion patterns stored in said model-by-model motion pattern memory.

13. A virtual pseudo-human figure generating system for generating a virtual pseudo-human figure model on a display apparatus and causing said virtual pseudo-human figure model to move on the display apparatus in accordance with motion patterns describing the motions of its different positions, comprising:

a model-by-model motion pattern memory for storing, as classified by model attributes, motion patterns that express the motions of said virtual pseudo-human figure model corresponding to movements designated "infantile" and "old-aged" which represent the movements of infantile and old-aged humans respectively;

a virtual pseudo-human figure model memory for storing information for generating said virtual pseudo-human figure model;

a virtual pseudo-human figure's motion generator for causing the virtual pseudo-human figure model on the basis of information stored in said virtual pseudo-human figure model memory; and a model-by-model motion pattern generator for reading out of said model-by-model motion pattern memory, when a motion pattern is instructed from outside, the motion pattern according to model attributes of the virtual pseudo-human figure model generated by said pseudo-human figure's motion generator, wherein said virtual pseudo-human figure's motion generator causes the virtual pseudo-human figure model to move in accordance with a motion pattern read out by said model-by-model motion pattern generator.

14. A method used in a virtual pseudo-human figure generating system for generating a virtual pseudo-human figure model on a display apparatus and causing said virtual pseudo-human figure model to move on the display apparatus in accordance with motion patterns describing the motions of its different positions, comprising:

storing in a memory, as classified by model attributes, motion patterns that express the motions of said virtual pseudo-human figure model corresponding to movements designated "infantile" and "old aged" which represent the movements of infantile and old-aged humans respectively; and causing the virtual pseudo-human figure model to move in accordance with its model attribute on the basis of a motion pattern stored in said memory.

15. A computer-readable medium having a program recorded thereon which, when a virtual pseudo-human figure model is generated on a display apparatus and said virtual pseudo-human figure is caused to move on the display apparatus in accordance with motion patterns describing the motions of its different positions, causes a computer to store in a memory, as classified by model attributes, motion patterns that express the motions of said virtual pseudo-human figure modal corresponding to movements designated "infantile" and "old-aged" which represent the movements of infantile and old-aged humans-respectively; and to have the virtual pseudo-human figure model to move in accordance with its model attribute on the basis of a motion pattern stored in said memory.

* * * * *